United States Patent
Curtelin et al.

(10) Patent No.: US 7,296,397 B2
(45) Date of Patent: Nov. 20, 2007

(54) VENTILATION SYSTEM FOR A CONVERGENT DIVERGENT EXHAUST NOZZLE

(75) Inventors: Raphael Curtelin, Saint Mery (FR); Marc Doussinault, Le Mee (FR); Guy Lapergue, Rubelles (FR); Didier Durand, Pontault Combault (FR)

(73) Assignee: SNECMA Moteurs, Paris (FR)

( * ) Notice: Subject to any disclaimer, the term of this patent is extended or adjusted under 35 U.S.C. 154(b) by 594 days.

(21) Appl. No.: 10/945,917

(22) Filed: Sep. 22, 2004

(65) Prior Publication Data
US 2005/0091964 A1 May 5, 2005

(30) Foreign Application Priority Data
Sep. 24, 2003 (FR) ................ 03 11187

(51) Int. Cl.
*F02K 1/12* (2006.01)
*F02K 1/82* (2006.01)

(52) U.S. Cl. ................. 60/232; 60/262; 60/266; 239/265.35; 239/265.17; 239/265.39

(58) Field of Classification Search ........ 260/262, 260/232, 266; 239/265.17, 265.35, 127.3, 239/265.39, 265.41
See application file for complete search history.

(56) References Cited

U.S. PATENT DOCUMENTS

| | | | |
|---|---|---|---|
| 4,000,612 A | | 1/1977 | Wakeman et al. |
| 5,255,849 A | * | 10/1993 | Mayer et al. ............. 239/127.3 |
| 5,435,127 A | * | 7/1995 | Luffy et al. .................. 60/204 |
| 5,586,431 A | * | 12/1996 | Thonebe et al. ........... 60/226.1 |
| 5,593,112 A | * | 1/1997 | Maier et al. ............. 244/117 A |
| 5,603,531 A | | 2/1997 | Maier |
| 5,775,589 A | * | 7/1998 | Vdoviak et al. .......... 239/127.1 |
| 5,799,874 A | * | 9/1998 | Eigenbrode et al. ..... 239/127.1 |
| 5,996,936 A | | 12/1999 | Mueller |
| 6,021,637 A | | 2/2000 | Scavo |
| 6,301,877 B1 | * | 10/2001 | Liang et al. ............... 60/226.1 |
| 7,213,393 B2 | * | 5/2007 | Lapergue et al. ............ 60/266 |
| 2003/0182929 A1 | * | 10/2003 | de Verduzan et al. ........ 60/266 |

FOREIGN PATENT DOCUMENTS

| | | |
|---|---|---|
| EP | 0 541 346 A1 | 5/1993 |
| EP | 1 333 172 A1 | 8/2003 |

* cited by examiner

*Primary Examiner*—Ted Kim
(74) *Attorney, Agent, or Firm*—Oblon, Spivak, McClelland, Maier & Neustadt, P.C.

(57) ABSTRACT

The invention relates to a ventilation system for a convergent divergent exhaust nozzle in a bypass turbojet comprising an afterburn chamber surrounded by an annular passage through which circulates a stream of cooling air, a convergent divergent axisymmetric nozzle arranged downstream of said afterburn chamber, each circle of flaps comprising alternately a plurality of controlled flaps, and a plurality of follower flaps, a circle of cold flaps arranged radially outside said nozzle and hinged at their upstream end to a conical shell linked to the downstream part of the casing. The means of cooling the divergent flaps comprise an annular plenum chamber delimited downstream by said conical shell and fed with cooling air through drillings made in a boundary wall between said plenum chamber and the downstream end of said annular passage, a plurality of distribution cells surrounding the plenum chamber and linked to the latter, said cells being delimited downstream by said conical shell and being arranged around the X axis in the planes of symmetry of the follower flaps and telescopic pipelines each linking a cell to the follower divergent flap situated in the same plane of symmetry as said cell.

9 Claims, 5 Drawing Sheets

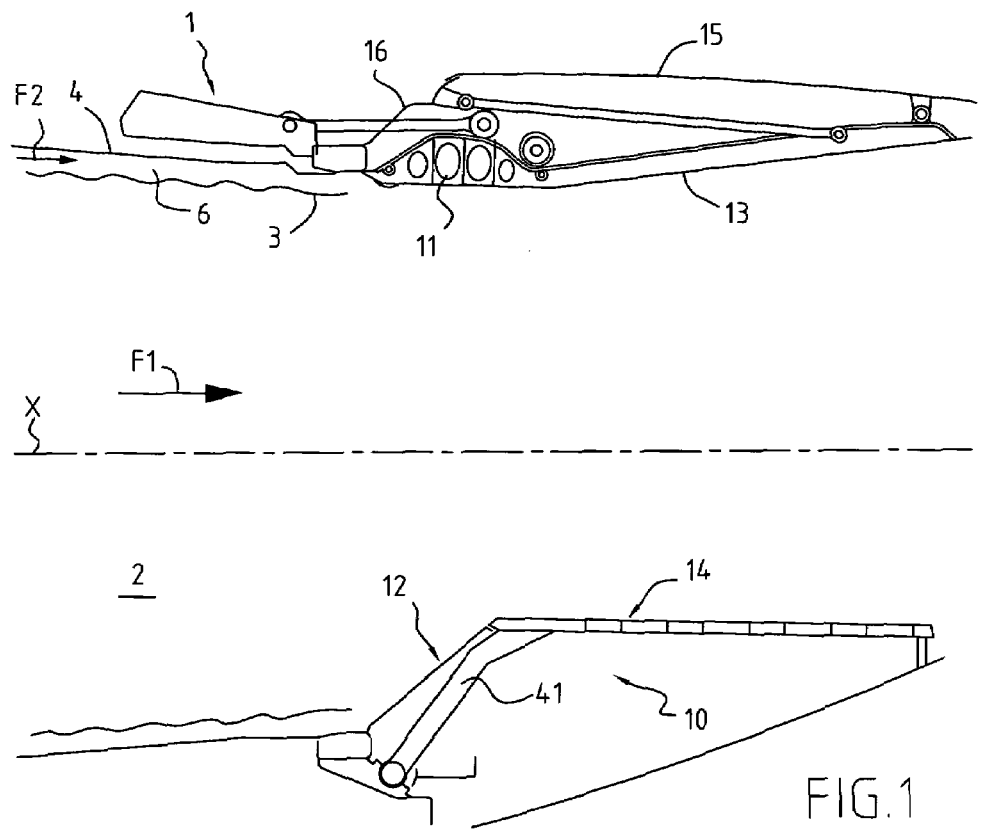
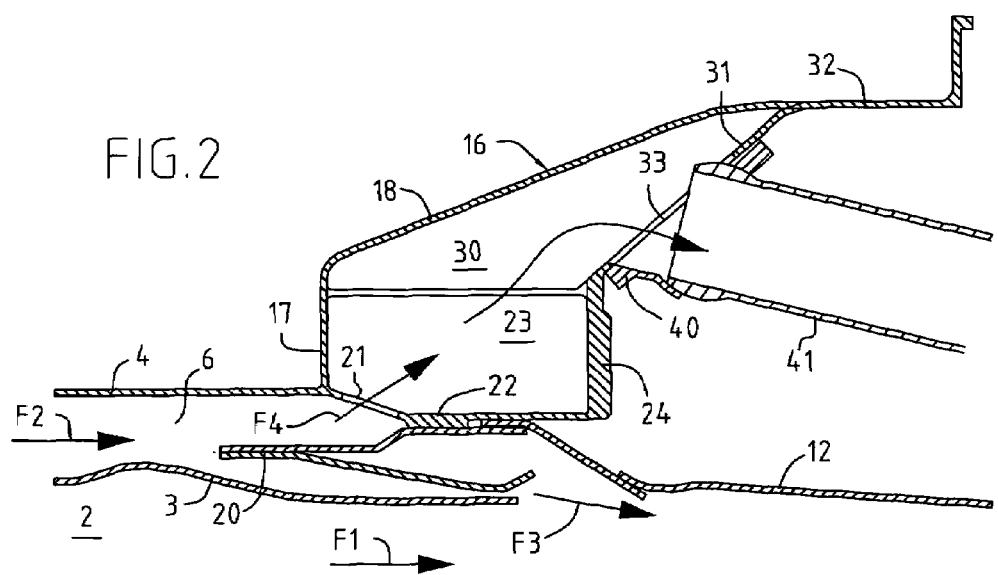

VENTILATION SYSTEM FOR A CONVERGENT DIVERGENT EXHAUST NOZZLE

The invention relates to a ventilation system for a convergent divergent nozzle equipping a turbojet for military use.

It relates more precisely to a bypass turbojet comprising an afterburn chamber of axis X delimited by an annular wall situated radially inside an annular casing, said annular wall and said casing defining an annular passage through which circulates a stream of cooling air, a convergent divergent axisymmetric nozzle arranged downstream of said afterburn chamber and comprising a circle of convergent flaps hinged at the downstream end of said casing and a circle of divergent flaps hinged at the downstream end of said convergent flaps, each circle of flaps comprising alternately a plurality of controlled flaps, and a plurality of follower flaps, a circle of cold flaps arranged radially outside said nozzle and hinged at their upstream end to a conical shell linked to the downstream part of said casing, means for creating a film of cooling air on the internal faces of said convergent flaps and means of cooling said divergent flaps.

U.S. Pat. No. 5,435,127 relates to a turbojet of the type mentioned above in which the cooling of the divergent flaps is achieved through a mixing of the nacelle air stream with a tapping off of air from the downstream part of the annular duct through which the stream for cooling the annular wall circulates.

The air is tapped off directly by bleeding from the duct with an adjustment valve at the bleed outlet. Downstream of the bleed elbow is placed a jet spout which carries out the mixing between the high-pressure engine air and the unpressurized nacelle air. The exact disposition of the tap-off is not indicated in this document. However, direct tap-off from the duct might not be effective for tapping off sizeable quantities of flow from the cooling stream, since it disturbs the operation of the ventilation. Hot gases might be reintroduced therein under the annular wall and there might be poor feeding of the film for cooling the convergent flaps. Moreover, it is difficult to house such a device within the footprint of the nozzle, since this environment is very cluttered with the jacks for controlling the flaps and the levers.

The aim of the invention is to efficiently and uniformly feed the divergent flaps of a convergent divergent nozzle cooled with a device which has a high degree of integration with the existing components.

The invention achieves its aim through the fact that the means of cooling said divergent flaps comprise:
- an annular plenum chamber delimited downstream by said conical shell and fed with cooling air through drillings made in a boundary wall between said plenum chamber and the downstream end of said annular passage,
- a plurality of distribution cells surrounding the plenum chamber and linked to the latter, said cells being delimited downstream by said conical shell and being arranged around the X axis in the planes of symmetry of the follower flaps, and
- telescopic pipelines each linking a cell to the follower divergent flap situated in the same plane of symmetry as said cell.

Thus the structure of the plenum chamber and of the cells is constituted by the conical shell and by complementary walls which strengthen the conical shell. Moreover, the follower divergent flaps are fed with pressurized cooling air issuing from the annular duct delimited by the annular wall and the casing.

The plenum chamber makes it possible to slow the speed of the air received and to increase the pressure of the air for cooling the follower divergent flaps.

The following arrangements are furthermore advantageously adapted:
- the follower divergent flaps are partitioned and cooled by the air delivered by the telescopic pipelines while the controlled divergent flaps have a single skin;
- the convergent flaps are of the single skin type;
- the conical wall comprises openings between the cells to allow the circulation of a nacelle air in the space surrounding the convergent divergent nozzle;
- the stream of cooling air circulating through the annular duct is divided into two streams by means of a stationary ring integral with the boundary wall, the radially inner stream being injected upstream of the convergent flaps via a slot and the radially outer stream being injected into the plenum chamber through the drillings of the boundary wall.

This latter arrangement makes it possible to avoid the creation of pressure reductions in regard to the bleeds of the prior art and the reintroduction of hot gases. This ensures, furthermore, homogeneity of the cooling of the convergent flaps.

Advantageously, the means for cooling the divergent flaps furthermore comprise means for adjusting the flow rate of cooling air for said flaps.

The flow rate adjustment means preferably comprise a ring mounted movably in a slide integral with the boundary wall, said ring and said slide each comprising a plurality of flow rate adjustment holes capable of being matched up with the drillings of the boundary wall by displacement of said ring.

According to a first embodiment, the ring is mounted movably in rotation about the X axis and is driven in rotation by a rack and pinion system by means of an actuator driving said pinion.

According to a second embodiment, the ring is mounted movably in translation parallel to the X axis and is displaced by a plurality of synchronized jacks.

Other advantages and characteristics of the invention will emerge from reading the following description given by way of example and with reference to the appended drawings in which:

FIG. 1 is a sectional view of a turbojet nozzle according to the invention, the upper part of this figure being a section through the plane of the controlled flaps, the nozzle being open, and the lower part of this figure being a section through the plane of the follower flaps, the nozzle being closed;

FIG. 2 is a half-section, on the mid plane of the follower flaps, of the air manifold placed at the rear of the nozzle support casing and backing onto the conical shell;

Figure 5:
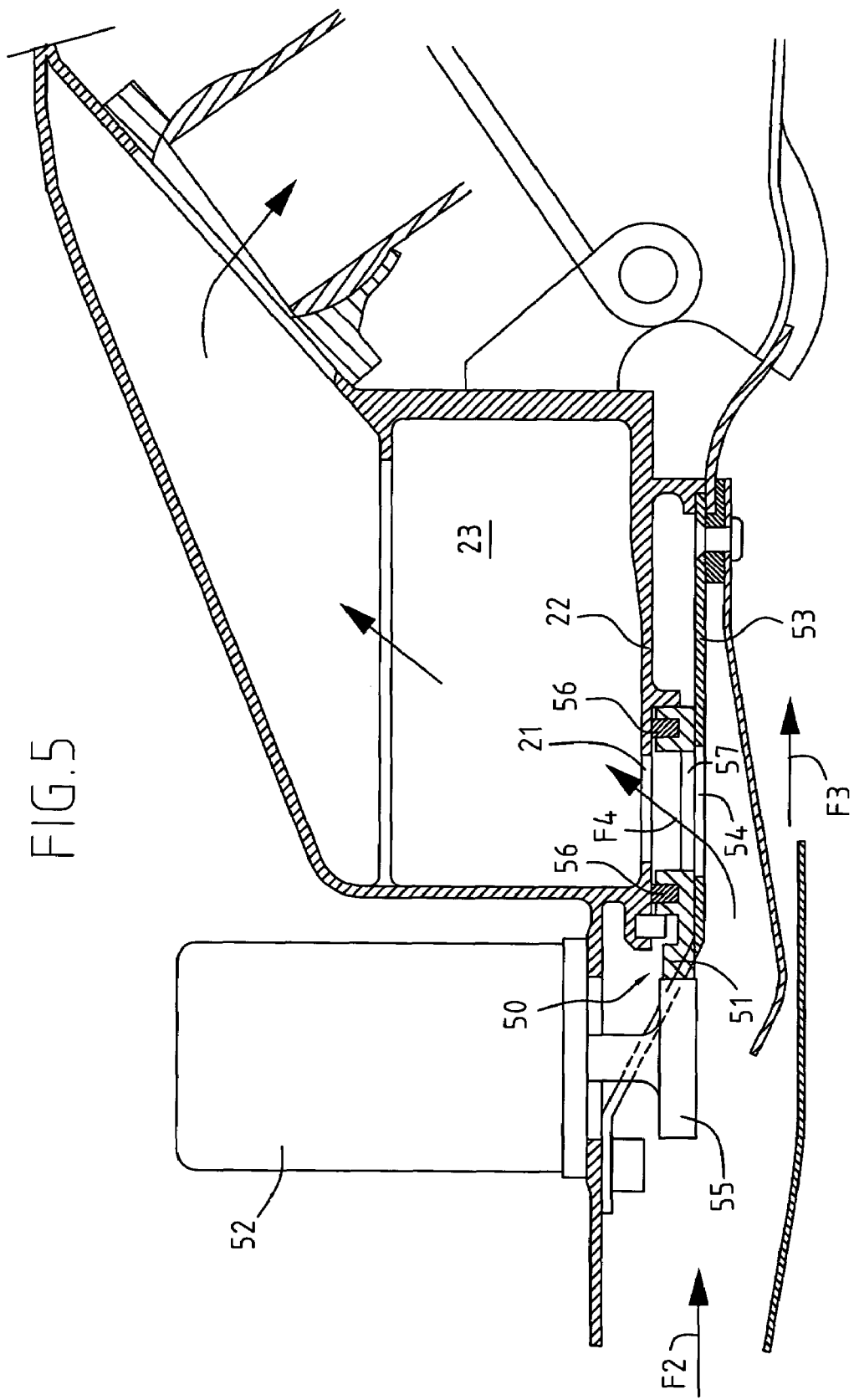
FIG. 5 is similar to FIG. 3 and shows a first embodiment of the ring for adjusting the flow rate of air for cooling the divergent flaps.
Figure 6:
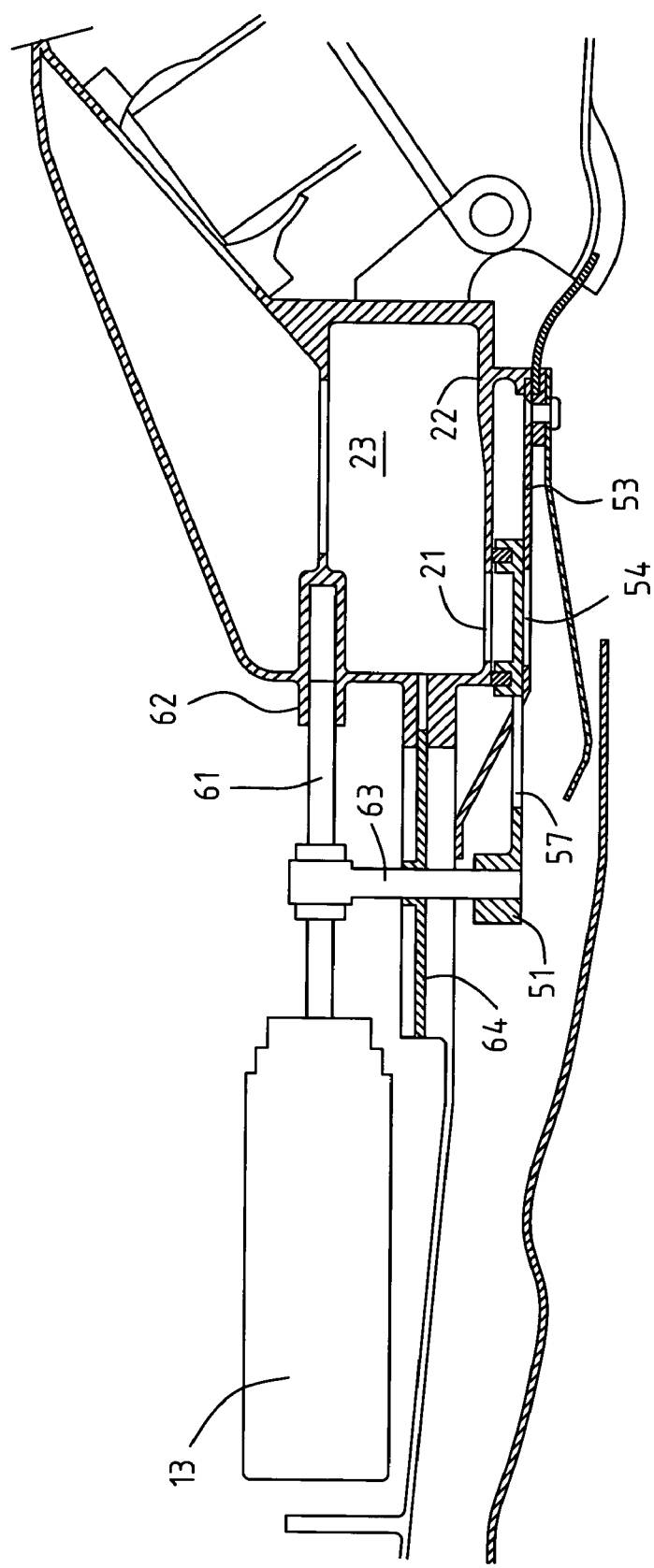
Figure 8:
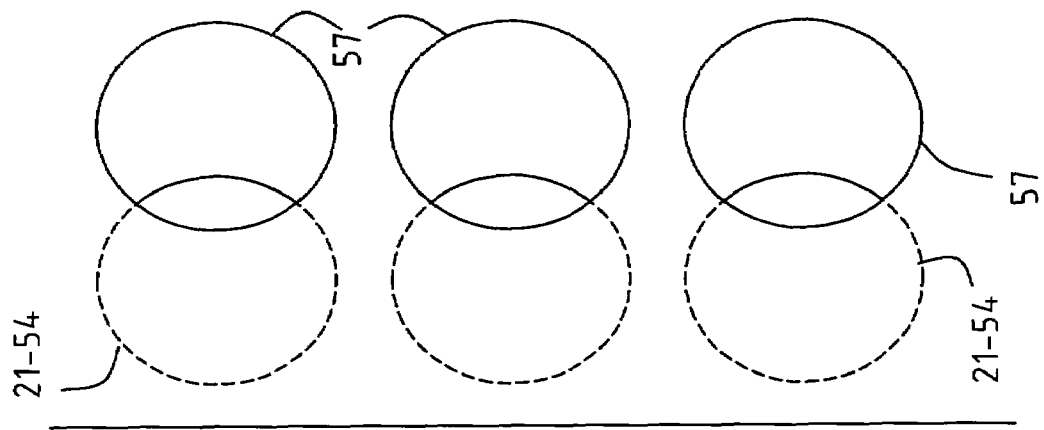
Figure 7:
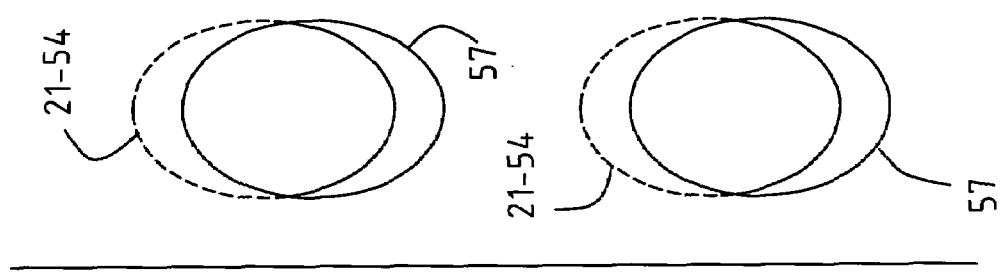

FIG. 6 similar to FIG. 5 shows a second embodiment of the ring for adjusting the air flow rate;

FIG. 7 shows, laid out flat, the system for shutting off the plenum chamber with the rotary control ring of FIG. 5, and FIG. 8 shows, laid out flat, the system for shutting off the plenum chamber with the sliding control ring of FIG. 6.

FIG. 1 shows the rear body 1 of a bypass aviation turbojet which comprises an afterburn chamber 2 of axis X through which the hot primary stream F1 circulates.

This afterburn chamber 2 is delimited by an annular wall 3 of axis X arranged radially inside a casing 4. The annular wall 3 and the casing 4 together delimit an annular duct 6 through which circulates a cold secondary stream F2, serving for the cooling of the annular wall 3 and of a convergent divergent nozzle 10 arranged downstream of the afterburn chamber 2.

This convergent divergent nozzle 10 comprises a first circle of convergent flaps comprising controlled convergent flaps 11, hinged to the downstream end of the casing 4 and alternating circumferentially with follower convergent flaps 12 also hinged to the downstream end of the casing 4, and a second circle of divergent flaps alternately exhibiting controlled divergent flaps 13 hinged at the downstream end of the controlled convergent flaps 11, and follower divergent flaps 14 hinged at the downstream end of the follower convergent flaps 12, the number of convergent flaps being even and equal to the number of divergent flaps.

Around the nozzle 10 are provided cold flaps 15 hinged at their downstream end to a conical shell 16 integral with the downstream part of the casing 4.

At the downstream end of the annular duct 6 is provided a ring 20 which splits the cold secondary stream F2 into a radially inner stream F3 which emerges through a slot tangentially to the internal wall of the convergent flaps, in such a way as to form a film of cold air driven by the hot stream F1 and licking the convergent flaps, the latter thus being able to be of the single skin type, and into a radially outer stream F4 intended for the cooling of the divergent flaps.

Figure 3:
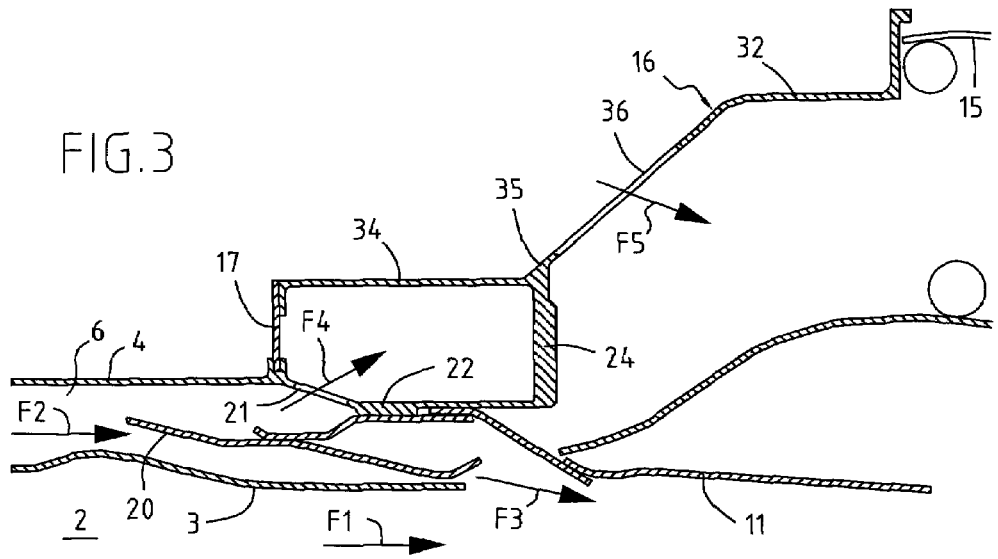
FIG. 3 is a half-section, along the mid plane of the controlled flaps of the air manifold shown in FIG. 3.

As is visible in FIGS. 2 and 3, via openings 21 made in the end wall 22 of the casing 4 and situated downstream of the conical shell 16, the stream F4 enters an annular plenum chamber 23 of axis X, delimited upstream by the radially inner part 17 of the conical shell 16, and downstream by the structure 24 for fixing the convergent divergent nozzle 10, integral with the casing 4. The end wall 22, comprising the openings 21, forms the boundary between the annular duct 6 and the plenum chamber 23.

Right around the plenum chamber 23 are provided a plurality of cells 30, each arranged in the plane of symmetry of a follower convergent flap 12 and of the follower divergent flap 14 hinged to said follower convergent flap 12. Each cell 30 is delimited upstream by a mid portion 18 of the conical shell 16, and circumferentially by two substantially parallel walls 19 formed in one piece with the conical shell 16, as is visible in FIG. 4. It is delimited downstream by a shut-off wall 31 which connects the fixing structure 24 to the upper part 32 of the conical shell 16, this shut-off wall 31 comprising an orifice 33, the use of which will be explained later in the present document.

Figure 4:
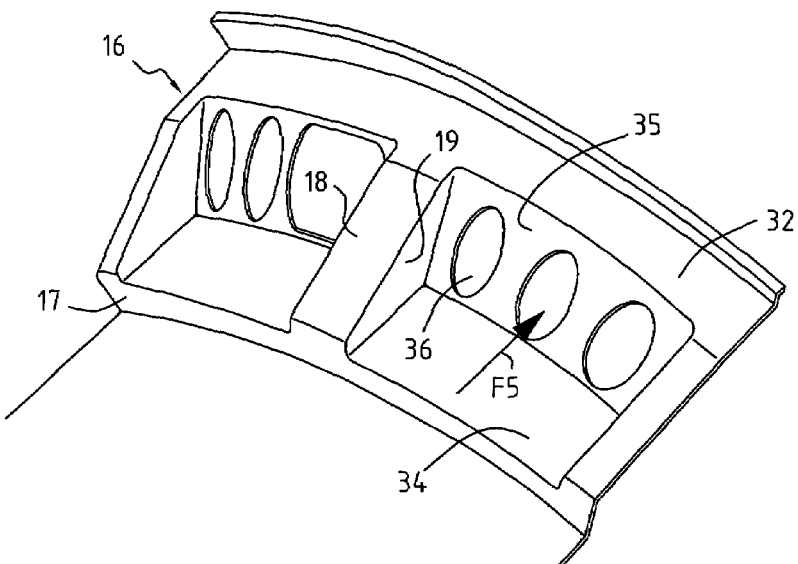
FIG. 4 is a perspective view of the conical shell, this view being taken from upstream.

Between two consecutive cells 30, the plenum chamber 23 is shut off by a substantially axial wall 34, visible in FIG. 4, which connects the radially inner ends of two adjacent walls 19.

It may also be seen in FIGS. 3 and 4 that the conical shell 16 furthermore exhibits a wall 35, steeply inclined, which extends between the downstream edge of the axial wall 34, the downstream edges of said two adjacent walls 19 and the upstream edge of the upper part 32, between two adjacent cells 30. This wall 35 exhibits several orifices 36 allowing the circulation of unpressurized nacelle air F5 so as to cool the various devices for controlling the flaps of the convergent divergent nozzle 10.

The orifice 33 of each cell comprises a link 40 for fastening the upstream end of a telescopic tube or pipeline 41 linked to the follower divergent nozzle 14 situated in the same axial plane passing through the X axis.

The follower divergent flaps 14 are of the partitioned type and the interior of these flaps 14 receives a part of the air stream F4, which is pressurized. Appropriate orifices make it possible to discharge this air into the stream F1 and toward the inner wall of the controlled divergent flaps 13 which may advantageously be of the single skin type.

The radially outer stream F4 is injected into the plenum chamber 23 through the drilled boundary partition 22. The stream F4 then divides, on exiting the chamber 23, between the various cells 30 serving to feed the telescopic tubes 41 and then the follower divergent flaps 14. The plenum chamber 23 allows regular tapping off at the level of the end of the annular duct 6 and makes it possible to feed the cells 30 with a uniform pressure and uniform flow rate. In this way, the film for cooling the inner walls of the convergent flaps 11 and 12 is not disturbed even when the stream F4 is heavily tapped off.

Furthermore, the shape given to the conical shell 16 as is visible in FIG. 4 makes it possible to produce the circuit for cooling the divergent flaps 13, 14 without an excessive footprint and makes it possible to stiffen this conical shell 16, by virtue of the partitions 19 delimiting the cells 30 and by virtue of the walls 35.

Advantageously, there is furthermore provided a device 50 for progressively controlling the flow rate F4 injected at the level of the follower divergent flaps 14. This device 50 comprises a controlled ring 51 making it possible to shut off the entrance of the plenum chamber 23 according to the flight conditions. Shut-off need not be highly leaktight, since the aim is to appreciably reduce the cooling flow rate F4, which is expensive in respect of performance under certain engine operating conditions. Conversely, in certain cases, one will wish to cool the nozzle with a high flow rate so as to obtain the lowest possible temperature on the flaps in order to decrease the infrared signature for example, even at the cost of a slight loss in engine performance.

FIG. 5 shows a first embodiment of the device 50. The ring 51 is mounted rotatably about the X axis and its position is adjusted by an actuator 52. The ring 51 is situated radially inside the boundary partition 22 facing the openings 21. On its lower face, the ring 51 is held in place by another stationary partition 53 in which are made openings 54 facing the openings 21. A pinion 55 mounted on the rod of the actuator 52 drives the ring 51 in rotation via a rack integral with the ring 51. Leaktightness segments 56 limit the leaks between the ring 51 and the plenum chamber 23 when the ring is closed.

The ring 51 also exhibits openings 57 which, in the position of maximum flow, are aligned with the openings 21 and 54. During the rotation of the ring 51 about the X axis, the openings 57 shift circumferentially with respect to the openings 21 and 54, as is shown in FIG. 7, between the position of maximum opening and a position of total shut-off, in which there is practically no more flow, except for leaks. It is thus possible to meter the flow continuously.

FIG. 6 shows a second embodiment of the device 50 which also comprises a ring 51 exhibiting openings 57 that can be arranged opposite the openings 21 of the boundary wall 22 and the openings 54 of a stationary partition 53 integral with the downstream end of the casing 4. Instead of being mounted rotatably about the X axis, the ring is able to be displaced parallel to the X axis by means of a plurality of synchronized jacks 60, for example three jacks, whose shafts 61 slide in guides 62. The connection between the shafts 61 and the ring is achieved by means of rods 63 passing through the casing 4 through leaktight passages 64.

In the position of maximum flow, the openings 57 are arranged facing the openings 21 and 54 and the system produces a flow. In another position (shown in FIG. 6) of the ring 51, the openings 21 and 54 are shut off by the ring 51 and there is practically no flow, except for the flows of leaks. For an intermediate position (shown in FIG. 8), it is possible to meter the flow of air continuously.

In both embodiments of the device 50, the leaktightness between the ring 51 and the stationary parts may be ensured by segments, so as to retard rapid wearing of the seals.

The device 50 offers the possibility of regulating the flow tapped off within a certain range so as to adapt it to the conditions of operation of the engine and to the operational circumstances.

The invention claimed is:

1. A bypass turbojet comprising an afterburn chamber of axis X delimited by an annular wall situated radially inside an annular casing, said annular wall and said casing defining an annular passage through which circulates a stream of cooling air, a convergent divergent axisymmetric nozzle arranged downstream of said afterburn chamber and comprising a circle of convergent flaps hinged at the downstream end of said casing and a circle of divergent flaps hinged at the downstream end of said convergent flaps, each circle of flaps comprising alternately a plurality of controlled flaps, and a plurality of follower flaps, a circle of cold flaps arranged radially outside said nozzle and hinged at their upstream end to a conical shell linked to the downstream part of said casing, means for creating a film of cooling air on the internal faces of said convergent flaps and means of cooling said divergent flaps, wherein the means of cooling said divergent flaps comprise:

an annular plenum chamber delimited downstream by said conical shell and fed with cooling air through drillings made in a boundary wall between said plenum chamber and the downstream end of said annular passage, a plurality of distribution cells surrounding the plenum chamber and linked to the latter, said cells being delimited downstream by said conical shell and being arranged around the X axis in the planes of symmetry of the follower flaps, and telescopic pipelines each linking a cell to the follower divergent flap situated in the same plane of symmetry as said cell.

2. The turbojet as claimed in claim 1, wherein the follower divergent flaps are partitioned and cooled by the air delivered by the telescopic pipelines while the controlled divergent flaps have a single skin.

3. The turbojet as claimed in claim 1, wherein the convergent flaps are of the single skin type.

4. The turbojet as claimed in claim 1, wherein the conical wall comprises openings between the cells to allow the circulation of a nacelle air in the space surrounding the convergent divergent nozzle.

5. The turbojet as claimed in claim 1, wherein the stream of cooling air circulating through the annular duct is divided into two streams by means of a stationary ring integral with the boundary wall, the radially inner stream being injected upstream of the convergent flaps via a slot and the radially outer stream being injected into the plenum chamber through the drillings of the boundary wall.

6. The turbojet as claimed in claim 5, wherein the means for cooling the divergent flaps furthermore comprise means for adjusting the flow rate of cooling air for said flaps.

7. The turbojet as claimed in claim 6, wherein the flow rate adjustment means comprise a ring mounted movably in a slide integral with the boundary wall, said ring and said slide each comprising a plurality of flow rate adjustment holes capable of being matched up with the drillings of the boundary wall by displacement of said ring.

8. The turbojet as claimed in claim 7, wherein the ring is mounted movably in rotation about the X axis and is driven in rotation by a rack and pinion system by means of an actuator driving said pinion.

9. The turbojet as claimed in claim 7, wherein the ring is mounted movably in translation parallel to the X axis and is displaced by a plurality of synchronized jacks.

* * * * *